Nov. 10, 1936.   E. L. MUEHL   2,060,236
DOUGH KNEADING AND CUTTING MACHINE
Filed Feb. 8, 1935
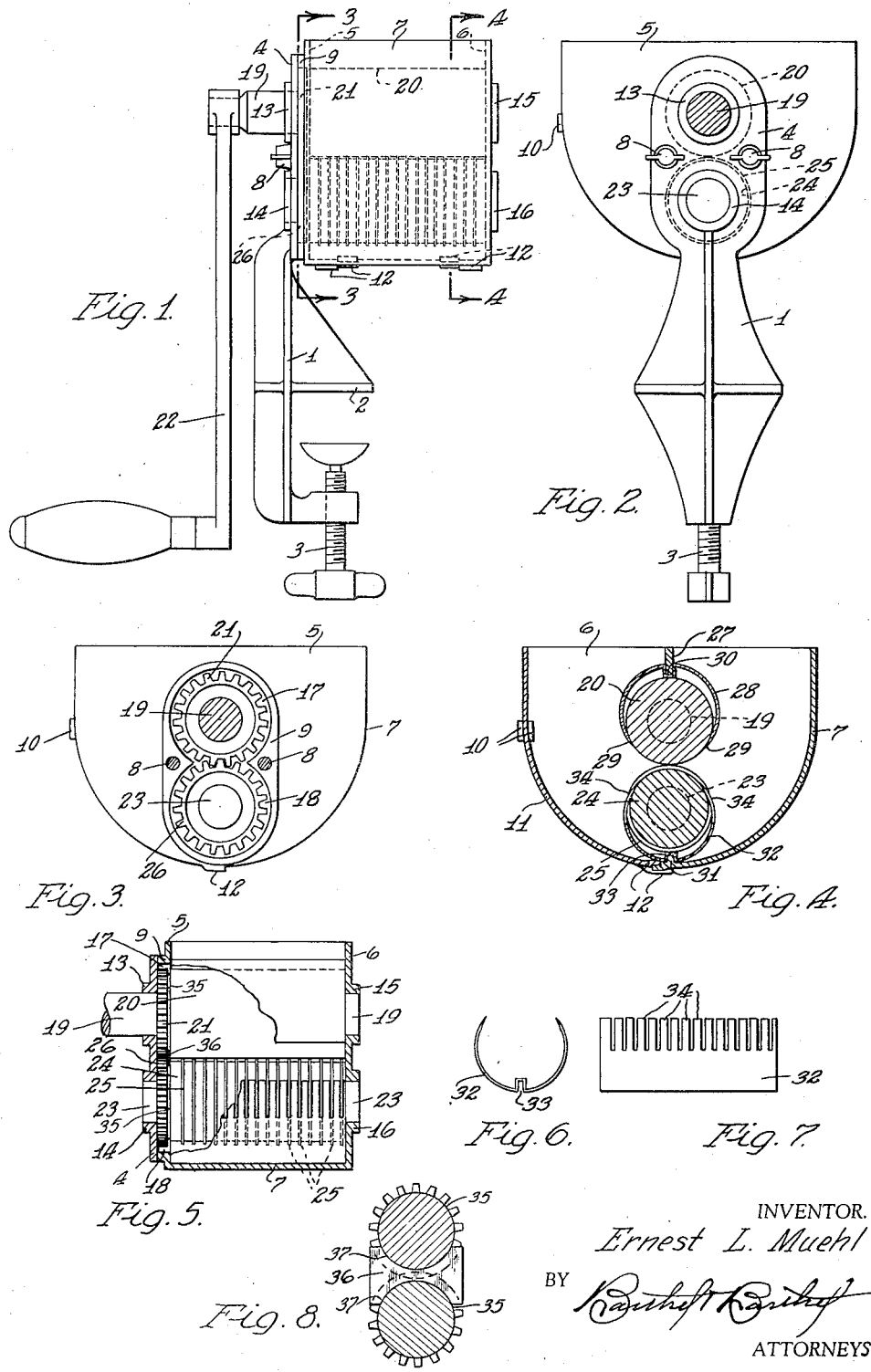
INVENTOR.
Ernest L. Muehl
BY
ATTORNEYS Patented Nov. 10, 1936

2,060,236

UNITED STATES PATENT OFFICE 2,060,236

DOUGH KNEADING AND CUTTING MACHINE

Ernest L. Muehl, Detroit, Mich.

Application February 8, 1935, Serial No. 5,542

5 Claims. (Cl. 107—12)

The present invention pertains to a machine for kneading and cutting noodles.

The primary object of the invention is to provide a machine for receiving dough, for kneading the same, and for cutting the dough into thin strips. This is accomplished by providing a pair of rollers in spaced apart relation with manual means for rotating the same. The rollers are supported in a housing which is constructed so that dough may be placed therein whereby rotation of the rollers causes the dough to pass between the rollers and be compressed thereby. By repeatedly passing the dough between the rollers the dough becomes kneaded. On one of the rollers is provided a series of knives or cutters which contact with the other roller so that as the dough is compressed it is also cut into strips.

Another object of the invention is to provide a novel form of stripping means, in a machine of the character set forth, for preventing the adhesion of the dough to the rollers.

Another and important object of the invention is to provide, in a machine set forth above, a construction which provides for rapid dis-assembly for the purpose of cleaning the same. With this object in view the machine is constructed so that the supporting means, the rollers, the housing for receiving the dough, and the stripping means may be easily taken apart for the purpose of washing or sterilizing the same. In this connection it is another object to provide a simple arrangement of parts so that they may be readily assembled by unskilled persons so as to adapt the device for domestic use.

With the above and other ends in view the invention consists in matters hereinafter set forth and more particularly pointed out with reference to the accompanying drawing, in which Figure 1 is a side elevation;

Fig. 2 is an elevation with the operating handle removed;

Figs. 3 and 4 are cross sections taken on lines 3—3 and 4—4 respectively of Fig. 1;

Fig. 5 is a vertical cross section;

Figs. 6 and 7 are elevations of a detail, and

Fig. 8 is a fragmentary cross section illustrating a detail.

Like characters of reference are employed throughout to designate corresponding parts.

The device comprises a supporting bracket 1 formed with a lug 2 and supporting an adjustable screw 3, the lug 2 and screw 3 providing means for clamping the bracket on a table or the like. At the top of the bracket 1 is formed an integral plate 4. A housing comprised of side walls 5 and 6 and an arcuate wall 7 is attached to the plate by removable securing elements 8, the latter being passed through suitable apertures in the plate 4 into screwthreaded bores in the wall 5. The wall 5, as more clearly shown in Figs. 1 and 5 is relatively thick where it contacts with the plate 4, the thickened part being designated 9.

Extending inwardly from the side walls 5 and 6 are spaced apart lugs 10 providing a support for a removable wall 11. The lower end of the wall 11 is provided with spaced apart prongs 12 which overlap the edge of wall 7 to support the lower end of the wall 11 with its upper end between respective pairs of lugs 10. The wall 11 is of arcuate form so that when it is assembled, as shown in Fig. 4, it combines with wall 7 in completing a housing of substantially semi-circular form when viewed in cross section. To remove the wall 11 it is moved, by manual pressure, to withdraw the prongs 12 from engagement with wall 7, at which time the upper end of the wall may be slipped downwardly from between the pairs of lugs 10.

In the plate 4 there is provided bearings 13 and 14 and in the wall 6 are formed bearings 15 and 16, the latter being coaxial with bearings 13 and 14 respectively. In the wall 5, co-axial with bearings 13—15 and 14—16 respectively are openings 17 and 18. A shaft 19 has one end extending through bearing 13 and its other end received in the bearings 15. On the shaft 19, between the walls 5 and 6, is a roller 20, the latter being formed integral thereon or secured against rotation relative thereto. Formed integral with the shaft 19, or secured against rotation thereon, is a gear 21, the latter being disposed on the shaft so that it is received within the opening 17. On the outwardly extending end of shaft 19 is provided a crank 22 by means of which shaft 19 may be manually rotated.

A shaft 23 has its opposite ends rotatably received in the bearings 14 and 16 and on this shaft, between the walls 5 and 6, is formed or integrally secured a roller 24. The roller 24 is of a diameter providing a slight space between the periphery thereof and the periphery of the roller 20. On the roller 24 are a series of spaced apart circumferentially extending ridges 25 whose peripheries contact with the roller 20 so that these ridges act as knives or cutters as will hereinafter appear. Also secured to the shaft 23, or formed integral therewith, is a gear 26, received in the opening 18 and meshing with the gear 21.

Extending transversely between the walls 5 and 6 is a rigid element 27 which cooperates with roller 20 in supporting a stripper element 28. The stripper element comprises a sheet of spring metal bent into substantially cylindrical form so that its edges resiliently engage the periphery of the roller 20. The stripper is bent to provide a lengthwise extending groove 30, the side walls of which are spaced apart for the reception of the element 27. When the roller 20 is assembled in place it prevents removal of the stripper from the rigid element 27.

On the wall 7, beneath roller 24, is provided a ridge 31 and a stripper element 32 is provided with a lengthwise extending groove 33 whose side walls are spaced apart to receive the ridge 31. The stripper 32 is likewise formed of a sheet of spring metal and is provided with a series of spaced apart fingers 34 which engage the roller 24 between the cutters 25. The stripper 32 is maintained on the ridge 31 by the roller 24.

In operation, noodle dough formed of wheat flour and eggs, for example, is placed in the housing and the crank 22 is rotated to cause rotation of rollers 20 and 24. As the rollers rotate the dough is passed between the same and is compressed and cut into thin strips. By repeatedly passing the same dough between the rollers it will become thoroughly kneaded and after it has become thoroughly kneaded it will remain in strips and is in condition for baking.

In order to exclude the dough from the gears the rollers 20 and 24 have a reduced diameter portion 35 forming a groove between the rollers and their respective gears. When the rollers are assembled in the housing a small plate 36 having semi-circular recesses 37 of a radius the same as the radius of the portion 35 is inserted between the rollers so that the edges of the recess fit into the groove between the gears and rollers. The plate 36 prevents the dough which is compressed between the rollers from contacting with the meshing portions of the gears.

Although a specific embodiment of the invention has been illustrated and described it will be understood that various changes may be made in the details of construction without departing from the scope of the appended claims, and such changes are contemplated.

What I claim is:—

1. In a device of the character described, a housing having side walls, one of said side walls having a pair of spaced apart bearings, the other of said side walls having an opening therein, rollers having spindles at opposite ends thereof, the spindles at one end of said rollers being received in said bearings and the spindles at the opposite ends extending through said opening, a supporting bracket, said bracket having an extended portion provided with bearings, and removable means for securing said bracket to said housing with the other spindles in said bearings in said extended portion.

2. In a device of the character described, a housing having side walls, one of said side walls having a pair of spaced apart bearings, the other of said side walls having an opening therein, a pair of rollers having axle spindles at opposite ends thereof, the spindles at one end of said rollers being received in said spaced apart bearings, gears on the spindles at the other ends of said rollers and meshing one with the other, said gears being disposed within the opening in said other sidewall, a supporting bracket, said bracket having a portion adapted to extend over said opening, and provided with bearings, and movable means for attaching said bracket to said housing with the other of said spindles extending into said bearings in said portion of said bracket.

3. In a device of the character described, a housing having parallel side walls of substantially semi-circular outline, rollers rotatably supported in said side walls, an arcuate end wall uniting said side walls from the top edge thereof to a point located substantially beneath said rollers, lugs formed on said side walls and an arcuate end wall loosely extending between said lugs and having its end supported on the end of the other side wall which terminates beneath said rollers.

4. In a device of the character described, a housing having side walls, rollers rotatably supported with respect to said side walls, intermeshing gears on said rollers, said gears being disposed in a recess in one of said side walls, said rollers having circumferential extending grooves, and a plate having recesses fitting into said grooves and providing a barrier between the interior of said housing and said gears.

5. In a device of the character described, a housing having side walls, rollers rotatably supported with respect to said side walls, and a stripper cooperating with at least one of said rollers, said stripper comprising a sheet of spring metal bent into substantially cylindrical form, said cylindrical form having a lengthwise extending groove and a stationary element extending between said side walls and received in said groove, said stationary element being positioned to maintain engagement between the inner periphery of the wall portion forming said groove and one of said rollers to maintain said stripper with its edges contacting with the periphery of said roller.

ERNEST L. MUEHL.